J. D. JOHNSON.
DIFFERENTIAL MECHANISM.
APPLICATION FILED DEC. 3, 1917.

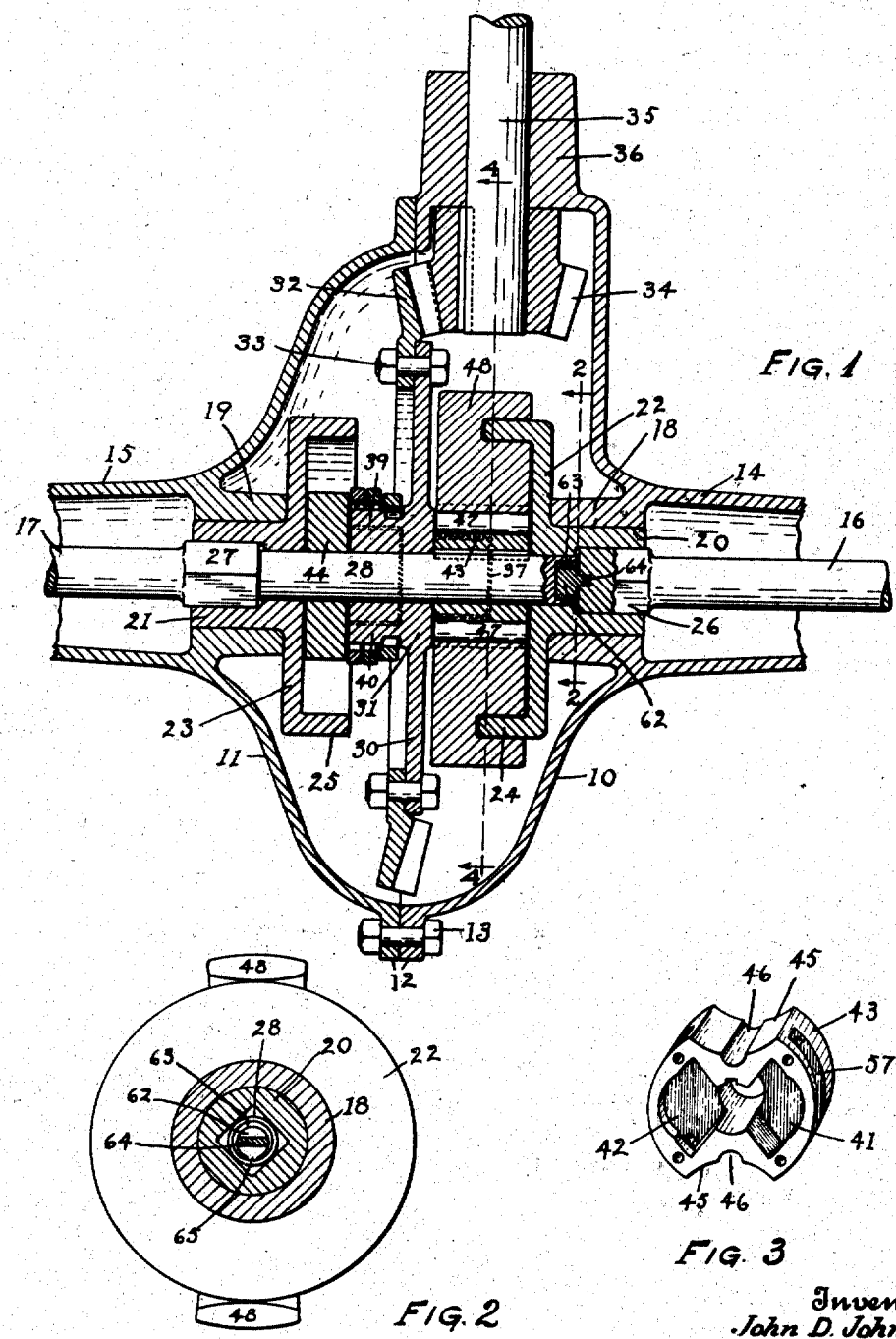

1,279,118.

Patented Sept. 17, 1918.
3 SHEETS—SHEET 2.

Inventor
John D. Johnson
By his Attorney
C. D. Haskins

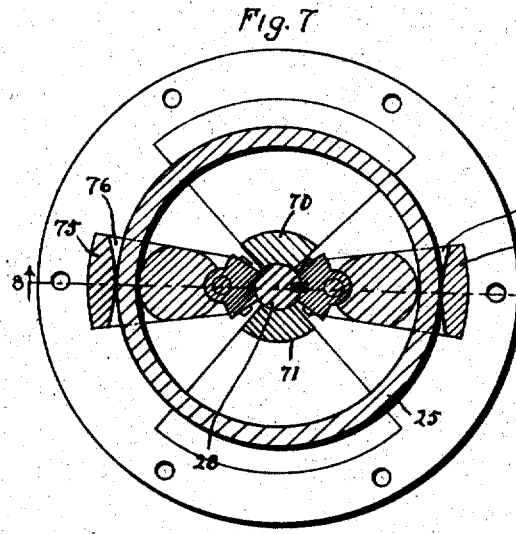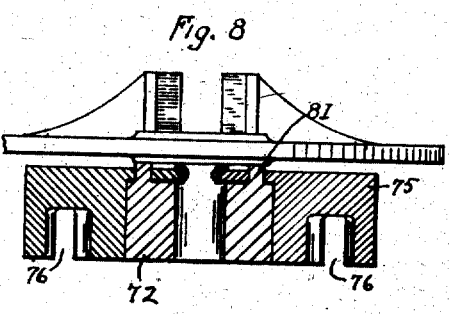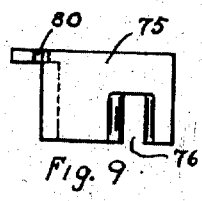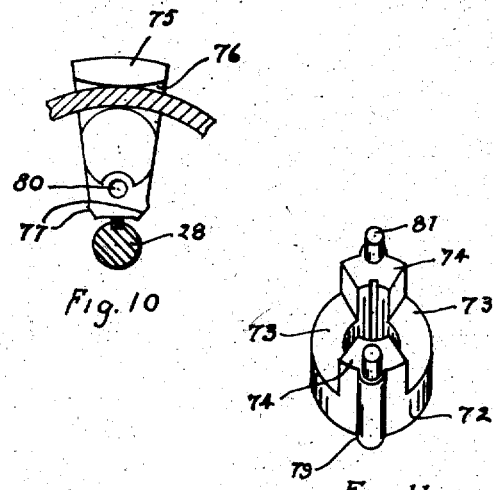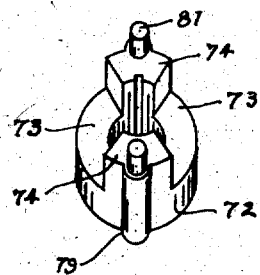

UNITED STATES PATENT OFFICE.

JOHN D. JOHNSON, OF SEATTLE, WASHINGTON.

DIFFERENTIAL MECHANISM.

1,279,118.  Specification of Letters Patent.  Patented Sept. 17, 1918.

Application filed December 3, 1917. Serial No. 205,254.

*To all whom it may concern:*

Be it known that I, JOHN D. JOHNSON, a citizen of the United States, residing at Seattle, in the county of King and State of Washington, have invented a certain new and useful Improvement in Differential Mechanism; of which the following is a specification.

My invention relates to improvements in differential mechanism for motor vehicles and is an improvement on the differential mechanism disclosed in my prior co-pending application Serial No. 142,758, filed January 16, 1917; and the object of my invention is to simplify and render more efficient the construction of differential mechanism of a type wherein the power is transmitted from a driving shaft to two driven shafts disposed at substantially right angles thereto to rotate the driven shafts at the same rate of speed or to permit the said driven shafts to rotate at different rates of speed.

The novel features of this device as distinguished from the device of my prior application hereinbefore referred to, reside in the form of construction and arrangement of the various parts that are adapted to clutch or grip the flanges of two disks that are connected with the differential axles of the two driving wheels of a motor vehicle.

I accomplish this object by devices illustrated in the accompanying drawings, wherein—

Figure 1 is a view in substantially horizontal midsection of a differential mechanism constructed in accordance with my invention;

Fig. 2 is a view in cross-section, on broken line 2, 2 of Fig. 1;

Fig. 3 is a view in perspective of a detail of my invention;

Fig. 7 is a view partly in section and partly in elevation illustrating a modified form of my invention;

Fig. 8 is a sectional view substantially on broken line 8, 8 of Fig. 7;

Fig. 9 is a detached view in elevation of a gripping dog of the form used in Figs. 7 and 8;

Fig. 10 is a fragmentary view in elevation illustrating a gripping dog in an operative position with respect to a flange with which it engages; and Fig. 11 is a view in perspective of one of the parts embodied in the device shown in Figs. 7 and 8.

Figure 4:
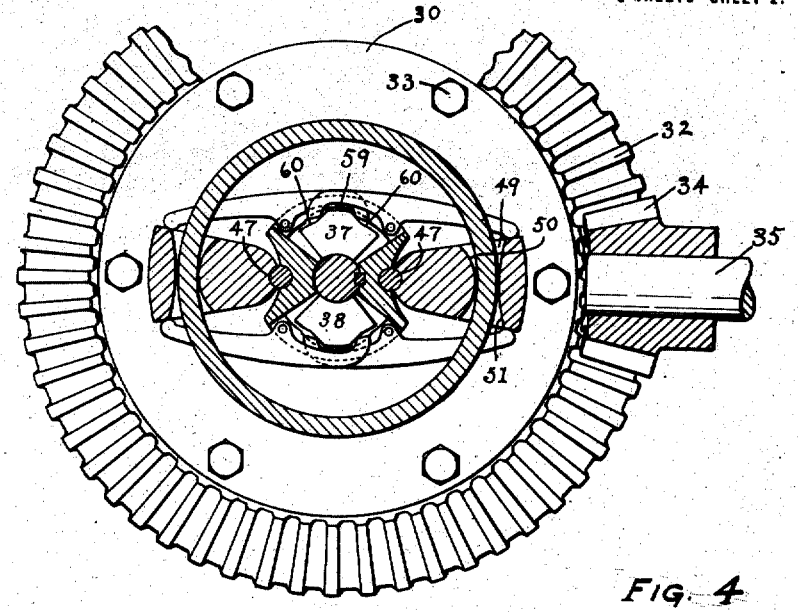
Fig. 4 is a view in cross-section on broken line 4, 4 of Fig. 1, certain portions of which being broken away.

Referring to the drawings throughout which like reference numerals indicate like parts, the numerals 10 and 11 designate the two halves of a differential housing that are flanged as at 12 and secured together by bolts 13.

The sections 10 and 11 are provided with integrally formed axially alined shaft housings 14 and 15, respectively, within which are disposed axles 16 and 17 of the floating type that extend to and are connected in a well known manner with driving wheels, not shown.

Concentrically disposed within the differential housings 10 and 11 and located in axial alinement with and adjacent to the axle housings 16 and 17 are two integrally formed bearings 18 and 19 respectively.

Rotatably disposed within the bearings 18 and 19 respectively, are the hub portions 20 and 21 of disks 22 and 23 that are provided with inturned annular peripheral flanges 24 and 25 as more clearly shown in Fig. 1.

The hubs 20 and 21 are provided with axial holes that are square at their outer ends for the reception of the squared ends 26 and 27 of the axles 16 and 17 and are round at their inner ends to serve as journals for the reception of the round ends of a stub shaft 28 that is disposed in axial alinement between the two squared ends of the shafts 16 and 17.

30 is a disk having a hub portion 31 that is journaled on the shaft 28 between the disks 22 and 23.

32 is an annular bevel gear that is secured to the circumferential portion of the disk 30 by bolts 33 and normally meshes with a pinion 34 on a driving shaft 35 that extends through a journal bearing 36 in the differential housing.

The hub 31 of the disk 30 is provided on one side with oppositely disposed outwardly projecting segments 37 and 38 and on the other side with similar oppositely disposed outwardly projecting segments 39 and 40 the faces of all of said segments being formed so that they lie in radial planes with respect to the hub.

The segments 37 and 38 are offset substantially ninety degrees with respect to the segments 39 and 40 so that a radial plane bisecting the segments 37 and 38 would be at right angles to a radial plane bisecting the segments 39 and 40.

The segments 37 and 38 are normally disposed to project into recesses 41 and 42 in a collar 43, shown in Fig. 3, that is adapted to be rigidly secured to the shaft 28 between the disk 30 and the disk 22 and the segments 39 and 40 are normally disposed to project into similar recesses in a similar collar 44 that is adapted to be secured to the shaft 28 between the disk 30 and the disk 23.

The recesses 41 and 42 are larger than the respective segments that project thereinto so that a limited angular movement of the disk 30 with respect to the collars 43 and 44 is permitted.

Portions of the periphery of each of the collars 43 and 44 are removed at two diametrically opposite points as indicated at 45 and diametrically opposite grooves 46 are formed in each of the removed portions 45 for the reception of bearing pins or rollers 47.

48 are clutch members or dogs that are rounded on their inner ends and grooved to fit over the rollers 47 and are provided near their outer ends with slots 49 having rounded outer and inner walls 50 and 51, respectively, and adapted to fit over and clutch the flanges 24 and 25. Two of the dogs 48 are provided in connection with the collar 43 and flange 24 and two in connection with the collar 44 and flange 25.

When the devices are assembled as shown in Fig. 1 and the disk 48 is rotated the collars 43 and 44 will be turned and will carry the inner ends of the dogs with them thus moving the dogs out of axial alinement and causing the curved walls 50 and 51 of the slots 49 to bind on the flanges 24 and 25 and thereby establish a driving connection between the disk 28 and the disks 22 and 23.

The rounded surfaces 50 and 51 will securely grip the flanges 24 and 25 without marring or cutting the same thereby preventing excessive wear on such flanges.

The gripping action of each pair of dogs 48 is controlled by four lever arms 52, 53, 54 and 55 that are mounted on pivots 56 within slots 57 in their respective collars 43 and 44 and have downturned inner ends 58 that engage with the outer surfaces of the segments 37, 38, 39 and 40 which surfaces are provided with outwardly projecting portions 59 affording inclined surfaces 60 on each side thereof that serve as cams to lift the inner ends of the lever arms.

Figure 5:
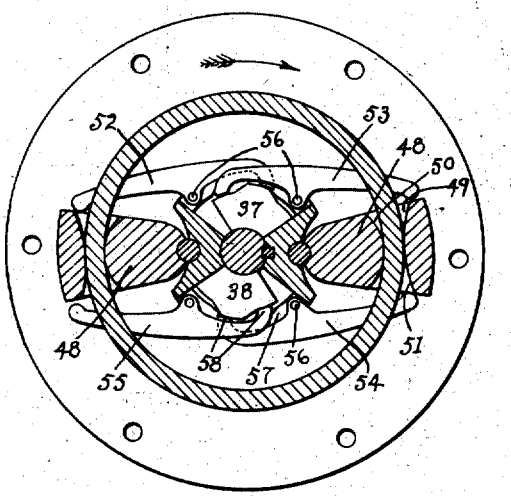
Fig. 5 is a view similar to Fig. 4 except that the outer bevel gear is removed and the centrally located parts are shown in a different operative position.
Figure 6:
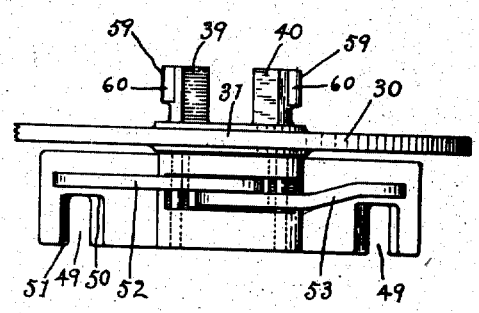
Fig. 6 is a detached view in elevation illustrating details of my invention.

The outer ends of the lever arms are adapted to bear against the outer ends of the dogs 48, as shown in Figs. 4 and 5, so that when the bevel gear disk 30 is rotated in the direction indicated by the arrow in Fig. 5, the inner ends of the arms 52 and 54 will be lifted by the inclined surfaces of the projections 59 on the segments 37 and 38, respectively, and the outer ends of such arms will press against the dogs 48, thus moving the d 48 into an inclined position with respect to the radial plane and causing them to grip the flanges 24 and 25.

To insure the engagement of the gripping dogs 48 with the flanges 24 and 25 at all times during the rotation of the differential axles 16 and 17, a frictional connection is made between the ends of the stub shaft 28 and the abutting ends of the differential axles 16 and 17.

This friction is formed by providing a circular recess in each end of the stub shaft and a slot in the abutting end of the differential axle and providing a small cylindrical member 62 adapted to be encircled for the greater portion of its circumference by a spring 63 and to fit within the circular recess the member 62 having a tongue 64 on the end thereof that is adapted to fit within the slot in the end of the differential axle and be rotated thereby.

A small portion of the circumference of the cylinder 62 projects between the two ends of the spring 63 as shown at 65 in Fig. 2 to prevent the spring from turning on the member 62, the spring being rotatable with the member 62 and being adapted to expand and frictionally rub against the walls of the annular recess in the end of the shaft 28.

It is obvious that if the axles 16 and 17 are rotated by any power other than that communicated through the driving gear the friction devices will exert sufficient torsion on the stub shaft 28 to actuate the arms 52, 53, 54 and 55 and cause the gripping dogs 48 to engage the flanges 24 and 25.

In the modified form shown in Figs. 7 to 11 inclusive, I have varied the form of the segments on the disk 30 and have changed the form of the gripping dogs and collars that fit over the shaft 28 so that the arms 52, 53, 54 and 55 may be done away with.

Referring to Figs. 7 to 11 inclusive, the numerals 70 and 71 designate the segments that project outwardly from the disk 30 and 72 are collars recessed as at 73 and having sections 74 that project between the segments 70 and 71 the collars being adapted to be keyed to the shaft 28.

75 are gripping dogs provided with grooves 76 having rounded walls and adapted to fit over the flanges 25 of the disks 22 and 23.

The inner ends of the gripping dogs 75 are adapted to project between the segments 70 and 71, as shown in Fig. 7, and are provided with protruding corners 77 that are adapted to engage with the walls of such segments to move the gripping dogs into engagement with the flanges.

The gripping dogs 75 are recessed as at 78 to adapt them to fit upon rounded bearing surfaces 79 on the collars 72 and the gripping dogs are perforated as at 80 for the reception of bearing pins 81 on the collar sections 72 the bearing pins 81 being on the same axis as the bearing surfaces 79.

By this form of construction it is obvious that when the disk 30 is rotated the sides of the segments 70 and 71 will engage the corners 77 of the gripping dogs 75 and by exerting a turning action around the pins 81 will cause the gripping dogs 75 to grip the flanges 25.

From the foregoing description it will be readily understood that the rotation of the disk 30 in either direction will cause both of the axle shafts 16 and 17 to rotate in the same direction by reason of the clutching of all the clutching dogs, but if either of the axle shafts 16 and 17 revolves faster in the same direction than the disk 30 by reason of its tractor wheel traveling around the outer side of a curved roadway, then the clutching dogs associated with such axle shaft will unclutch to permit its associated flange to slip through the slots of said clutching dogs.

Obviously changes may be made in the forms, dimensions and arrangement of parts of my invention without departing from the spirit thereof.

What I claim is:

1. A differential mechanism comprising a housing provided with two journal bearings disposed in opposite ends thereof in axial alinement with each other and further provided with a shaft bearing in one of its sides disposed with its axis at right angles to the axis of said two journal bearings; disks having inwardly directed flanges and outwardly directed hubs that are rotatably disposed within said two journal bearings, said hubs having holes extending axially therethrough; shafts projecting within the outer portion of the hole within each of said hubs and rotatable with said disks; a shorter shaft having its opposite ends rotatably journaled within the inner ends of the holes in said hubs; a disk having a hub rotatably mounted on said shorter shaft, said hub having two outwardly projecting radially bifurcated segments on each side, and each of said segments having projections on the peripheral portion thereof; sleeves rigidly mounted on said shorter shaft, each of said sleeves being slotted on two opposite sides and having two recesses in one end thereof that fit over said segments and are larger than said segments to admit of relative angular movement; two oppositely disposed gripping dogs having an end bearing on opposite sides of said sleeves said dogs having a slot in the edge thereof provided with rounded walls and disposed to fit over the annular flanges of said first named two disks to grip said disks, and two lever arms pivotally mounted in the slot on each side of said sleeve, said lever arms each having outer ends that engage the outer ends of said gripping dogs and curved inner ends that rest on the peripheral portions of said segments whereby when said segments are angularly moved with respect to said sleeves the inner curved ends of said arms will be lifted by the projections on the peripheral portion of said segments thereby causing the outer end of said arms to urge said dogs into a gripping position.

2. A differential mechanism comprising a housing provided with axially alined horizontal bearings; disks having inwardly directed peripheral flanges and outwardly directed hubs journaled in said bearings; axle shafts having a driving connection with said hubs; a stub shaft journaled in said hubs in alinement with said axle shafts; a disk having a hub rotatably mounted on said stub shaft said hub having two outwardly projecting radially bifurcated segments on each side and each of said segments having projections on the peripheral portions thereof; sleeves rigidly mounted on said stub shaft on opposite sides of said last named disk each of said sleeves being slotted on two opposite sides and having recesses in one end thereof adapted to fit over said segments, said recesses being of larger dimensions than said segments; oppositely disposed gripping dogs having their inner ends in engagement with said sleeves and having slots near their outer ends provided with curved walls and adapted to fit over the inwardly directed flanges on said first named disk and two lever arms pivotally mounted in each slot in each of said sleeves the outer ends of said lever arms being disposed to engage the sides of said disks and the inner ends of said lever arms being curved and adapted to rest on the projecting peripheral portions of said segments whereby when said segments are moved with respect to said sleeves said dogs will be urged into gripping engagement with said flanges.

3. A differential mechanism comprising a housing; axially alined bearings provided in said housing; disks having inwardly directed peripheral flanges and outwardly directed hubs adapted to be journaled in said bearings; axles connected with said hubs and rotatable therewith; a stub shaft mounted for rotation in said hubs between the adjacent ends of said axles; frictional connections between the ends of said stub shaft and the ends of said axles; a driving member mounted on the central portion of said stub shaft; segments projecting outwardly from both sides of the hub portion of said driving member said segments having protuberances on their peripheral portions; collars fixedly secured on said stub shaft on each side of said driving member, said collars having recesses in the ends thereof that fit over said segments; gripping dogs having their inner ends disposed in engagement with said collars and provided with slots adapted to fit over the flanges on said disks; and lever arms pivotally connected with said collars and adapted to be moved by said protuberances on said segments to urge said gripping dogs into engagement with said flanges.

4. A differential mechanism comprising a housing, which housing is provided with axially alined horizontal bearings; disks having hubs journaled in said bearings and provided with inwardly directed peripheral flanges; axle shafts having a driving connection with said hubs; a shorter shaft journaled in the said hubs between the adjacent ends of the axle shaft; friction devices connecting the ends of said shorter shaft with the ends of said axle shafts; sleeves secured to said shorter shaft adjacent each of said disks; oppositely disposed gripping dogs bearing on said sleeves and having slots in the edges thereof provided with rounded walls and adapted to fit over and grip said inwardly directed flanges; a driven member on said stub shaft in engagement with said sleeves to rotate said sleeves; and means actuated by the turning of said driven member to urge said dogs into gripping engagement with said flanges.

5. A differential mechanism of the class described comprising two spaced disks provided with inwardly directed peripheral flanges; a freely rotatable shaft extending between said two disks; a driven member mounted on said shaft and having segments that project outwardly on both sides of the hub portion thereof, said segments having projections on their peripheral portions; sleeves fixed to said shaft on each side of said driven member, each of said sleeves having oppositely disposed slots and oppositely disposed longitudinal grooves and being provided in one end with recesses adapted to fit over said segments, said recesses being larger than said segments to admit of relative movement; gripping dogs having grooved inner ends that register with the grooves in said sleeves and afford a receptacle for key pins, said dogs having slots that fit over said flanges; and arms pivoted in the slots in said sleeves and actuated by the projections on the peripheral portions of said segments to control the gripping engagement of said dogs.

6. A differential mechanism comprising a housing provided with axially alined horizontal bearings, disks having inwardly directed peripheral flanges and outwardly directed hubs journaled in said bearings, axle shafts having a driving connection with said hubs, a stub shaft journaled in said hubs in alinement with said axle shafts, a disk having a hub rotatively mounted on said stub shaft said hub having two outwardly projecting radially bifurcated segments on each side, sleeves rigidly mounted on said stub shaft and having sections that project between the segments on said hub, oppositely disposed gripping dogs pivoted on said sleeves said dogs having rounded grooves in the outer ends thereof that fit over said flanges, and projecting corners on the inner ends of said dogs and adapted to be engaged by said segments to move said dogs into engagement with said flanges.

In witness whereof, I hereunto subscribe my name this 23rd day of November A. D., 1917.

JOHN D. JOHNSON.